(12) United States Patent
Wang et al.

(10) Patent No.: US 11,909,349 B2
(45) Date of Patent: *Feb. 20, 2024

(54) MAIN BEAM AND APPLICATION THEREOF, AND PHOTOVOLTAIC TRACKING SUPPORT

(71) Applicant: Arctech Solar Holding Co., Ltd., Jiangsu (CN)

(72) Inventors: Shitao Wang, Jiangsu (CN); Pengxiao Yu, Jiangsu (CN); Jianmin Li, Jiangsu (CN)

(73) Assignee: Arctech Solar Holding Co., Ltd., Jiangsu (CN)

( * ) Notice: Subject to any disclaimer, the term of this patent is extended or adjusted under 35 U.S.C. 154(b) by 425 days.

This patent is subject to a terminal disclaimer.

(21) Appl. No.: 17/286,881

(22) PCT Filed: Jan. 17, 2020

(86) PCT No.: PCT/CN2020/072881
§ 371 (c)(1),
(2) Date: Apr. 20, 2021

(87) PCT Pub. No.: WO2020/173257
PCT Pub. Date: Sep. 3, 2020

(65) Prior Publication Data
US 2021/0384864 A1   Dec. 9, 2021

(30) Foreign Application Priority Data
Feb. 28, 2019  (CN) .......................... 201910147811.7

(51) Int. Cl.
*H02S 30/10* (2014.01)
*F24S 25/70* (2018.01)
(Continued)

(52) U.S. Cl.
CPC .............. *H02S 30/10* (2014.12); *F24S 25/70* (2018.05); *F24S 30/40* (2018.05); *H02S 20/32* (2014.12); *H02S 40/22* (2014.12)

(58) Field of Classification Search
CPC .......... H02S 20/32; H02S 30/10; H02S 40/22; Y02E 10/47; F24S 30/425; F24S 2030/15; F24S 25/70; F24S 30/40
(Continued)

(56) References Cited

U.S. PATENT DOCUMENTS 7,647,924 B2 * 1/2010 Hayden ................... F24S 25/10
  40/607.01
8,615,960 B2 * 12/2013 Marcotte ................. F24S 25/13
  52/638

(Continued)

FOREIGN PATENT DOCUMENTS

AU     2022100162 A4 * 12/2022  .............. F24S 25/10
CN     206585514 U  * 10/2017  .............. F24S 50/20
(Continued)

*Primary Examiner* — Taylor Morris
(74) *Attorney, Agent, or Firm* — Chambliss, Bahner & Stophel, P.C.; Stephen D. Adams (57) ABSTRACT

Disclosed are a main beam and a use thereof and a photovoltaic tracking bracket, wherein the main beam includes a flat plate and an elliptical curved plate, each of both ends of the flat plate are respectively fixedly connected to a corresponding end of the elliptical curved plate to form a ring shape, and a plane where the flat plate is located is perpendicular to a long axis of an ellipse where the elliptical curved plate is located. Also provided is the use of the main beam in the photovoltaic tracking bracket. The photovoltaic tracking bracket includes the main beam; a stand column; and a bearing seat comprising a bearing ring, a Z-shaped support plate and a bottom plate connected sequentially from top to bottom, wherein the Z-shaped support plate has a Z-shaped cross section, the main beam is installed inside the bearing (Continued)

ring, the flat plate of the main beam faces a photovoltaic assembly, and the bottom plate is connected to the stand column. Under the premise of ensuring the same thickness, the main beam of the present invention improves the resistance moment of the lateral cross section and saves costs, and when applied to the photovoltaic tracking bracket, the main beam can slow down the hot spot effect of the double-sided photovoltaic assembly and prolong the service life of the same.

9 Claims, 6 Drawing Sheets

(51) Int. Cl.
  *F24S 30/40* (2018.01)
  *H02S 20/32* (2014.01)
  *H02S 40/22* (2014.01)
(58) Field of Classification Search
  USPC .......................................................... 248/121
  See application file for complete search history.

(56) References Cited

U.S. PATENT DOCUMENTS

| | | | | |
|---|---|---|---|---|
| 8,882,073 | B2* | 11/2014 | Habdank | F24S 25/70 |
| | | | | 248/220.21 |
| 10,305,418 | B2* | 5/2019 | Bapat | H02S 20/23 |
| 2010/0208375 | A1* | 8/2010 | Albisu Tristan | F24S 30/42 |
| | | | | 29/525.01 |
| 2010/0307991 | A1* | 12/2010 | Belikoff | H01L 31/042 |
| | | | | 211/41.17 |
| 2012/0152311 | A1* | 6/2012 | Miller | G01S 3/7861 |
| | | | | 136/246 |
| 2013/0269752 | A1* | 10/2013 | Corio | F24S 30/425 |
| | | | | 136/246 |
| 2014/0290716 | A1* | 10/2014 | Stubbs | H02S 20/00 |
| | | | | 136/251 |
| 2015/0068513 | A1* | 3/2015 | DiSanto | F24S 23/82 |
| | | | | 126/606 |
| 2017/0317641 | A1* | 11/2017 | Rainer | F24S 25/65 |
| 2018/0254740 | A1* | 9/2018 | Corio | F24S 30/452 |
| 2018/0347859 | A1* | 12/2018 | Ros Ruiz | F16B 7/0486 |
| 2019/0020302 | A1* | 1/2019 | Chen | F24S 50/20 |
| 2021/0367550 | A1* | 11/2021 | Wang | H02S 20/32 |
| 2022/0077816 | A1* | 3/2022 | Morin | H02S 20/10 |
| 2022/0107117 | A1* | 4/2022 | Delgado-Nanez | F24S 30/425 |
| 2023/0279987 | A1* | 9/2023 | Dally | F16M 11/10 |
| | | | | 248/550 |

FOREIGN PATENT DOCUMENTS

| | | | | |
|---|---|---|---|---|
| CN | 107959463 A | * | 4/2018 | ............ F24S 50/20 |
| CN | 114026344 A | * | 2/2022 | ............ F16C 11/04 |
| CN | 114423956 A | * | 4/2022 | ............ F16B 7/0413 |
| EP | 3410033 A1 | * | 12/2018 | ............ F16B 7/0486 |
| JP | 2022514916 A | * | 2/2022 | ............ H02S 20/32 |
| WO | WO-2014162834 A1 | * | 10/2014 | ............ F24J 2/5207 |
| WO | WO-2017155798 A1 | * | 9/2017 | ............ F16B 2/14 |
| WO | WO-2018226734 A1 | * | 12/2018 | ............ E04C 3/07 |

* cited by examiner

MAIN BEAM AND APPLICATION THEREOF, AND PHOTOVOLTAIC TRACKING SUPPORT

TECHNICAL FIELD

The invention relates to a field of structural design of a photovoltaic tracking support, and in particular to a main beam and a use thereof and a photovoltaic tracking bracket.

BACKGROUND

In the prior art, photovoltaic power generation has become a trend and is widely used in various places. Photovoltaic power generation is based on a principle of photovoltaic effect to directly convert solar energy into electrical energy. Regardless of whether it is used independently or connected to a grid, a photovoltaic power generation system mainly consists of three parts: a photovoltaic assembly, a controller and an inverter. In order to ensure that the photovoltaic assembly maintains high power generation efficiency, a photovoltaic tracking bracket has been developed, in which a photovoltaic assembly is installed on a main beam, and the main beam drives the photovoltaic assembly to rotate with the movement of the sun.

The main beam of the photovoltaic tracking bracket is required to have a certain bending strength. The U.S. Pat. No. 7,647,924B2 entitled "SYSTEM FOR SUPPORTING ENERGY CONVERSION MODULES" discloses a main beam consisting of a circular curved plate and a flat plate. The bending strength of the main beam has been partially improved, however, in order to achieve the same strength and rigidity of the main beam, its weight is still relatively large, and its cost accounts for a large part of that of the photovoltaic tracking bracket, resulting in a tremendous cost of the photovoltaic tracking bracket.

SUMMARY

An object of the invention is to provide a main beam and a use thereof and a photovoltaic tracking bracket, wherein the main beam has an improved resistance moment of a lateral cross section, a lighter weight and a reduced cost. Upon application of the above main beam, in addition to the aforementioned technical effects, the photovoltaic tracking bracket is more evenly stressed, and its installation is more convenient and faster.

The technical solutions provided by the invention are as follows:

a main beam, including: a flat plate and an elliptical curved plate, each of both ends of the flat plate being respectively fixedly connected to a corresponding end of the elliptical curved plate to form a ring shape, and a plane where the flat plate is located being perpendicular to a long axis of an ellipse where the elliptical curved plate is located.

Benefiting from the above structure, when the main beam is applied to a photovoltaic tracking bracket, due to the special shape of the main beam, the resistance moment of the lateral cross section of the main beam can be improved by sacrificing less torsion resistance. Compared with the arc D-shaped main beam in the prior art, on the basis of ensuring the same thickness, the resistance moment of the lateral cross section can be increased by 5.14%, and steel material can be saved by 0.04% per meter, which has good practical application value.

Preferably, a transition section is provided between the flat plate and the elliptical curved plate, and an outer surface of the transition section is smooth.

The flat plate is connected to the elliptical curved plate through the transition section, so as to avoid occurrence of a sharp joint between the flat plate and the elliptical curved plate, which is prone to scratch the staff.

Preferably, a reflective layer is provided on an outer surface of the flat plate and/or the transition section.

When a double-sided photovoltaic assembly is installed on the main beam, since a part of the double-sided photovoltaic assembly will be shielded by the main beam and cannot be irradiated by light, the shielded part of the double-sided photovoltaic assembly will act as a load to consume the energy generated by the other irradiated part of the double-sided photovoltaic assembly. At this time, the shielded part of the double-sided photovoltaic assembly will generate heat, causing a hot spot effect that seriously shortens the life time of the double-sided photovoltaic assembly. The present structure reflects light to the shielded part of the double-sided photovoltaic assembly via the reflective layer, so as to reduce generation of the hot spot effect and prolong the life time of the double-sided photovoltaic assembly.

Also provided is a use of the main beam in a photovoltaic tracking bracket installed with a double-sided photovoltaic assembly.

A photovoltaic tracking bracket with the aforementioned main beam, further including: a stand column; and a bearing seat including a bearing ring, a Z-shaped support plate and a bottom plate connected sequentially from top to bottom, the Z-shaped support plate having a Z-shaped cross section in a horizontal direction, the main beam being installed inside the bearing ring, the flat plate of the main beam facing the photovoltaic assembly, and the bottom plate being connected to the stand column.

Benefiting from the above structure, since the Z-shaped support plate is used to fix the bearing ring, compared to the C-shaped support structure used to fix the bearing ring in the prior art, the Z-shaped support plate is more evenly stressed and thus can carry a larger load.

Preferably, the photovoltaic tracking bracket further including: a stand column top seat including a first connecting plate, wherein both ends of the first connecting plate extend towards the stand column to form a second connecting plate, the second connecting plate is connected to the stand column, the first connecting plate is perforated with a first horizontal adjustment waist hole, the bottom plate is perforated with a second horizontal adjustment waist hole corresponding to the first horizontal adjustment waist hole, the first horizontal adjustment waist hole and the second horizontal adjustment waist hole are locked via a bolt, a long axis of the first horizontal adjustment waist hole and a long axis of the second horizontal adjustment waist hole are perpendicular to each other, and the long axis of the first horizontal adjustment waist hole is parallel to an extension direction of the main beam, or the long axis of the first horizontal adjustment waist hole is perpendicular to the extension direction of the main beam.

When adjusting the position or angle of the main beam, loosen the bolt, and then make position adjustment of the main beam in its own axial direction and/or in a direction perpendicular to its axial direction through cooperation of the first horizontal adjustment waist hole and the second horizontal adjustment waist hole, or make angle adjustment of the main beam on the horizontal plane by rotating the main beam. Finally, tighten the bolt to fix the main beam.

Preferably, two of the first horizontal adjustment waist holes are provided and symmetrical about a center of the first connecting plate, two of the second horizontal adjustment waist holes are provided and symmetrical about a center of the bottom plate.

Through respective provision of two of the first horizontal adjustment waist holes and two of the second horizontal adjustment waist holes, since they are respectively symmetrical about the center of the first connecting plate and the center of the bottom plate, when making angle adjustment of the main beam by rotating the bottom plate, the bottom plate can rotate around its own center, such that the angle adjustment of the main beam can be more accurate.

Preferably, each of the second connecting plates is provided with a vertical adjustment waist hole and a vertical fixing hole, the stand column is provided with a stand column adjustment waist hole corresponding to the vertical adjustment waist hole, the stand column is provided with a stand column fixing hole corresponding to the vertical fixing hole, a long axis of the vertical adjustment waist hole and a long axis of the stand column adjustment waist hole are perpendicular to each other, the stand column adjustment waist hole and the vertical adjustment waist hole are fastened via a bolt, the stand column fixing hole and the vertical fixing hole are fastened via a bolt.

Benefiting from the above structure, by adjusting the positions of the vertical adjustment waist hole and the stand column adjustment waist hole, the angle adjustment of the stand column top seat in the height direction can be made, and its rotation center is the center of the vertical fixing hole.

Preferably, a first end of the main beam is a shrinkable pipe section formed by extruding the first end of the main beam, an inner surface of the shrinkable pipe section is welded or riveted with a locking nut; the shrinkable pipe section of the main beam extends into a second end of an adjacent main beam, a locking bolt sequentially passes through the second end of the adjacent main beam and the shrinkable pipe section of the main beam and is fastened by screwing to a corresponding locking nut.

Benefiting from the above structure, adjacent main beams are connected. Compared with the method of connecting via a connecting plate in the prior art, which uses more bolts and has slow installation speed, in the present structure, since the locking nut is pre-arranged on the inner surface of the shrinkable pipe section, it is merely necessary to tighten the locking bolt and the corresponding locking nut. The installation speed is faster, and no additional connecting plate is needed, which saves costs.

Preferably, a plurality of locking nuts are provided and are evenly arranged on the inner surface of the shrinkable pipe section of the main beam, the locking nuts are the locking bolts are provided in one-to-one correspondence.

Adjacent main beams are connected via a plurality of evenly arranged locking nuts, making connection between each other stronger.

The main beam and the use thereof and the photovoltaic tracking bracket as provided by the invention can bring the following beneficial effects:
- on the basis of ensuring the same thickness, the present main beam has better resistance moment of the lateral cross section and lighter weight. Compared with the prior art, the resistance moment of the lateral cross section can be increased by 5.14%, and steel material can be saved by 0.04% per meter. When the present main beam is applied to the photovoltaic tracking bracket, the main beam can reflect light to the shielded part of the double-sided photovoltaic assembly, thereby reducing the hot spot effect on the double-sided photovoltaic assembly and prolonging life time of the double-sided photovoltaic assembly. Meanwhile, since the Z-shaped support plate is used to support the bearing ring, when compared with the support structure with a C-shaped cross section in the prior art, the Z-shaped support plate is stressed more evenly, so that the load capacity of the Z-shaped support plate is improved.

BRIEF DESCRIPTION OF THE DRAWINGS

Hereinafter, preferred embodiments will be described in a clear and easy-to-understand manner with reference to the accompanying drawings, and the above characteristics, technical features, advantages and implementations of the main beam and the use thereof and the photovoltaic tracking bracket will be further illustrated.

DESCRIPTION OF REFERENCE NUMERALS

1—main beam, 1a—shrinkable pipe section, 1b—first connecting hole, 1c—first connecting hole, 1d—flat plate, 1e—transition section, 1f—elliptical curved plate, 2a—locking nut, 2b—locking bolt, 3—stand column, 4a—first connecting plate, 4b—second connecting plate, 4c—first horizontal adjustment waist hole, 4d—vertical adjustment waist hole, 4e—vertical fixing hole, 5—bottom plate, 5a—second horizontal adjustment waist hole, 6—Z-shaped support plate, 7—bearing ring.

DETAILED DESCRIPTION OF THE EMBODIMENTS

In order to illustrate examples of the invention or technical solutions in the prior art more clearly, specific embodiments of the invention will be described below with reference to the drawings. Obviously, the drawings in the following description are merely some examples of the invention. For those of ordinary skill in the art, other drawings and embodiments can be obtained based on these drawings without creative work.

In order to make the drawings concise, each of them only schematically shows the parts related to the invention, and they do not represent the actual structure as a product.

Example 1

Figure 1:
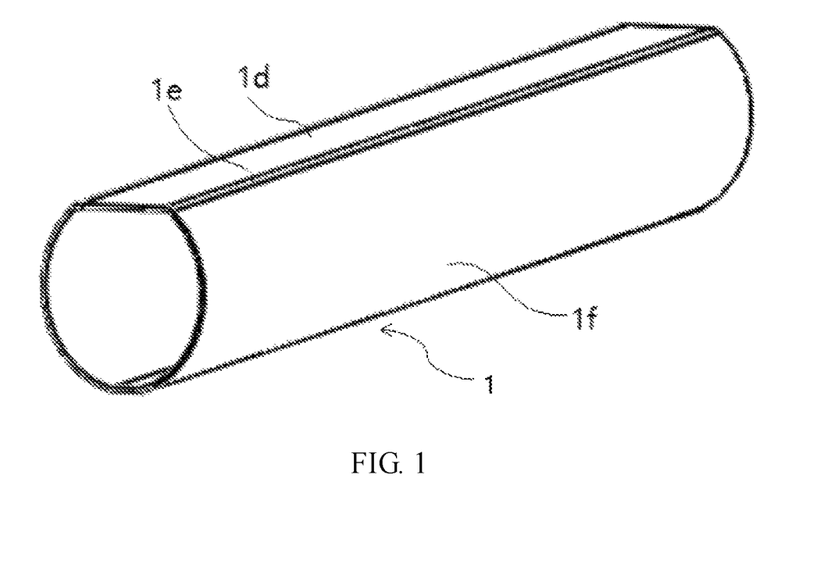
FIG. 1 is a perspective view of a main beam.
Figure 2:
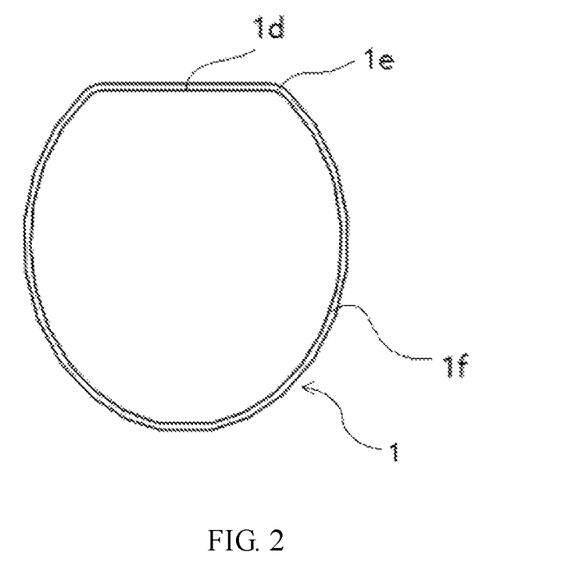
FIG. 2 is a cross-sectional view of a main beam.

As shown in FIGS. 1-2, example 1 discloses a specific embodiment of a main beam, which specifically includes: a flat plate 1d and an elliptical curved plate 1f, each of both ends of the flat plate 1d is respectively fixedly connected to a corresponding end of the elliptical curved plate 1f to form a ring shape, and a plane where the flat plate 1d is located is perpendicular to a long axis of an ellipse where the elliptical curved plate 1f is located. In order to smoothly transition between the flat plate 1d and the elliptical curved plate 1f, a transition section 1e is provided between the flat plate 1d and the elliptical curved plate 1f, and an outer surface of the transition section 1e is smooth.

When the main beam 1 is installed on the photovoltaic tracking support, the main beam 1 is used for bending resistance test and the weight per unit length is calculated. The specific data are listed in Table 1 below.

TABLE 1

|  | Arc D-Shaped Main Beam | Main Beam 1 | (Main Beam 1-Arc D-Shaped Main Beam)/Arc D-Shaped Main Beam |
|---|---|---|---|
| Thickness/mm | 4 | 4 | 0 |
| Resistance Moment of the Lateral Cross Section $M_x/mm^3$ | 46340 | 48720 | 5.14% |
| Weight per Length/(kg/m) | 12.451 | 12.446 | −0.04% |

The arc D-shaped main beam mentioned in U.S. Pat. No. 7,647,924B2 in the Background was installed on the photovoltaic tracking bracket, so that the arc D-shaped main beam had the same thickness as the main beam 1 of the present example. As measured in the test, the resistance moment of the lateral cross section of the arc D-shaped main beam is 46340/mm³, and the weight per length is 12.451 kg. Comparing with the data shown in Table 1, it can be seen that for main beam 1 of the present example, on the basis of ensuring the same thickness, the resistance moment of the lateral cross section can be increased by 5.14%, and the cost is saved by about 0.04%.

Example 2

As shown in FIGS. 1-2, example 2 is based on example 1. In example 2, a reflective layer is provided on an outer surface of the flat plate 1d and the transition section 1e. The reflective layer is formed by coating reflective material or wrapping tin foil paper. In the present example, the reflective material is metal spray paint. In other specific example, the reflective material can also be white paint, luminescent film, etc., which will not be repeated herein.

When the main beam 1 is installed on the photovoltaic tracking bracket, the flat plate 1d is facing the double-sided photovoltaic assembly, and light is reflected by the reflective layer to the part of the double-sided photovoltaic assembly that is shielded by the main beam 1, thereby reducing the hot spot effect. In areas with different irradiation resources, the life time of the double-sided photovoltaic assembly can still be maintained for 25 years. The main beam 1 in example 1 is installed on the photovoltaic tracking bracket. In areas with good radiation resources, the double-sided photovoltaic assembly may fail due to the hot spot effect in the shielded area on the back, so that the life time of the double-sided photovoltaic assembly is greatly reduced.

Further, in order to achieve diffuse reflection at the flat plate 1d and the transition section 1e, so that the shielded part of the double-sided photovoltaic assembly receives more uniform light, the outer surfaces of the flat plate 1d and the transition section 1e are designed to be rough, and then the reflective layer is laid on the rough outer surfaces, that is to say, the reflective surface is a diffuse reflective surface. Therefore, when light irradiates the reflective layer, since the reflective layer is uneven, diffuse reflection is formed.

Of course, the outer surface of the separate flat plate 1d or the outer surface of the separate transition section 1e can also have a reflective layer, which can reflect light to a certain extent on the shielded part of the double-sided photovoltaic assembly, thereby reducing the hot spot effect, which will not be repeated herein.

Example 3

As shown in FIGS. 1-6 and 8-10, example 3 discloses a specific embodiment of a photovoltaic tracking bracket. In addition to any one of the main beams 1 in example 1 and 2, the photovoltaic tracking bracket also includes a stand column 3 and a bearing seat.

Figure 8:
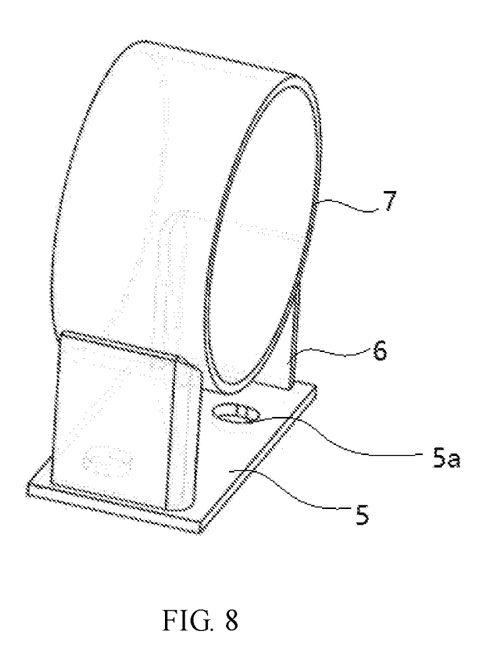
FIG. 8 is a perspective view of a bearing seat.

As shown in FIG. 8, the bearing seat includes a bearing ring 7, a Z-shaped support plate 6 and a bottom plate 5 connected sequentially from top to bottom, wherein the Z-shaped support plate 6 has a Z-shaped cross-sectional shape in a horizontal direction, the main beam 1 is installed inside the bearing ring 7, the flat plate 1d of the main beam 1 is facing the photovoltaic assembly, and the bottom plate 5 is connected to the stand column 3. Wherein, when compared with the support structure with a C-shaped cross section in the prior art, the Z-shaped support plate 6 is stressed more evenly, so that the load capacity of the Z-shaped support plate 6 is improved.

More preferably, as shown in FIGS. 3 and 8-10, in order to make position and angle adjustment of the main beam 1, the present example also includes a stand column top seat including a horizontally arranged first connecting plate 4a, wherein both ends of the first connecting plate 4a extend towards the stand column 3 to form a second connecting plate 4b, the second connecting plate 4b is connected to the stand column 3. In the present example, both ends of the first connecting plate 4a extend downwards to form the second connecting plate 4b, that is to say, the second connecting plate 4b is vertically arranged.

Figure 9:
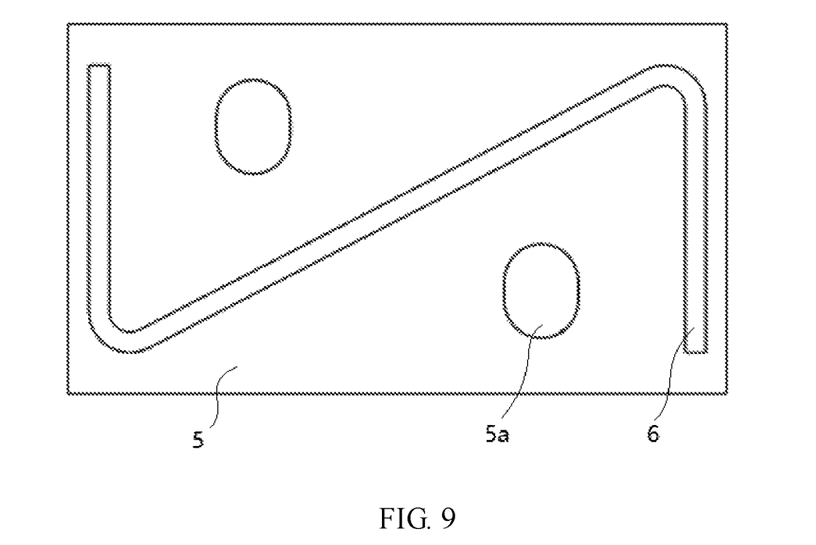
FIG. 9 is a top view of a bottom plate and a Z-shaped support plate.
Figure 10:
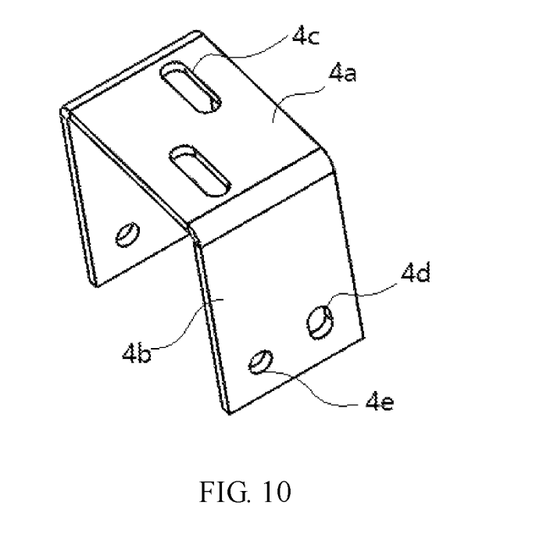
FIG. 10 is a perspective view of a stand column top seat.

As shown in FIG. 10, the first connecting plate 4a is perforated with two first horizontal adjustment waist holes 4c symmetrical about the center of the first connecting plate 4a, and the centers of the two first horizontal adjustment waist holes 4c are on the same diagonal line. As shown in FIGS. 8-9, the bottom plate 5 is provided with two second horizontal adjustment waist holes 5a symmetrical about the center of the bottom plate 5 and corresponding to the first horizontal adjustment waist holes 4c, and the centers of the two second horizontal adjustment waist holes 5a are on the same diagonal line. The two second horizontal adjustment waist holes 5a are respectively located on both sides of the Z-shaped support plate. The first horizontal adjustment waist hole 4c and the second horizontal adjustment waist hole 5a are locked via a bolt.

As shown in FIGS. 8-10, the long axis of the first horizontal adjustment waist hole 4c and the long axis of the second horizontal adjustment waist hole 5a are perpendicular to each other. The long axis of the first horizontal adjustment waist hole 4c is perpendicular to the extension direction of the main beam 1, and the long axis of the second horizontal adjustment waist hole 5a is parallel to the extension direction of the main beam 1.

When adjusting the horizontal position of the main beam 1, first loosen the bolts that lock the first horizontal adjustment waist holes 4c and the second horizontal adjustment waist holes 5a, move the main beam 1 to a suitable position, and then tighten the bolts to make the bottom plate 5 fixed to the first connecting plate 4a of the stand column top seat.

When adjusting the angle of the main beam 1 in the horizontal direction, first loosen the bolts that lock the first horizontal adjustment waist holes 4c and the second horizontal adjustment waist holes 5a, rotate the main beam 1 with the center of the bottom plate 5 as the center of rotation. After adjusting the main beam 1 to a proper angle, tighten the bolts to fix the bottom plate 5 to the first connecting plate 4a of the stand column top seat. Of course, the main beam 1 can be adjusted first in terms of position in the horizontal direction, and then in terms of angle in the horizontal direction. The adjustment method is the same as above.

In other specific examples, the long axis of the first horizontal adjustment waist hole 4c can also be parallel to the extension direction of the main beam 1, and the long axis of the second horizontal adjustment waist hole 5a is perpendicular to the extension direction of the main beam 1, which will not be repeated herein.

Figure 3:
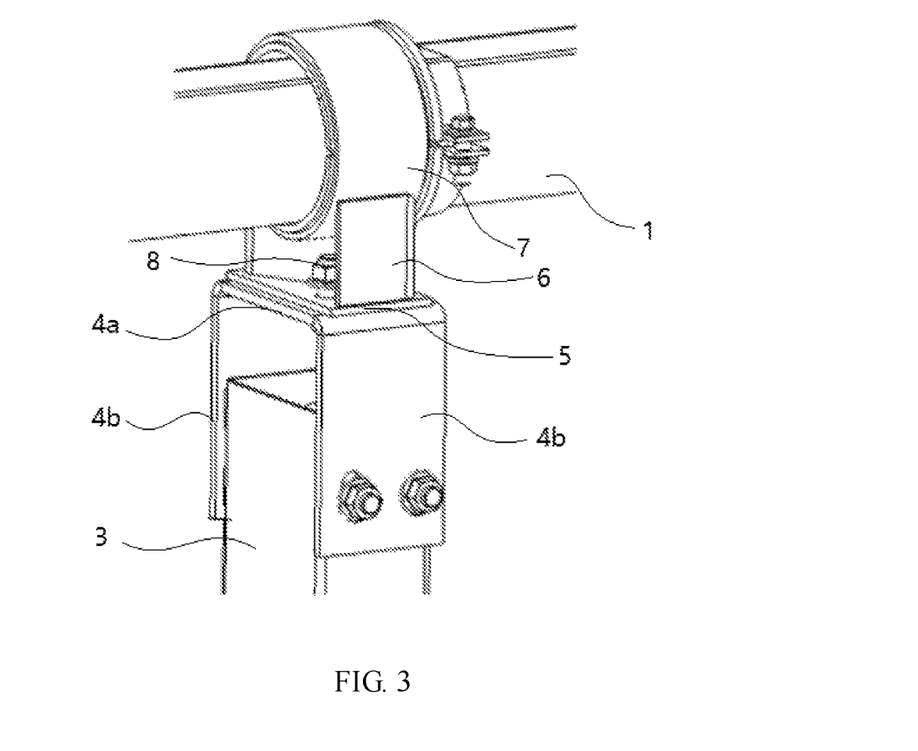
FIG. 3 is a perspective view of a photovoltaic tracking bracket.

In order to make angle adjustment of the stand column top seat in the height direction, as shown in FIGS. 3 and 10, each second connecting plate 4b is perforated with a vertical adjustment waist hole 4d and a vertical fixing hole 4e, that is to say, in the present example, both of the two second connecting plates 4b are perforated with a vertical adjustment waist hole 4d and a vertical fixing hole 4e. The stand column 3 is perforated with a stand column adjustment waist hole corresponding to the vertical adjustment waist hole 4d, and the column 3 is perforated with a stand column fixing hole corresponding to the vertical fixing hole 4e, that is to say, a stand column adjustment waist hole and a stand column fixing hole are perforated on both side walls of the column 3. The long axis of the vertical adjustment waist hole 4d is perpendicular to the long axis of the stand column adjustment waist hole. As shown in FIG. 10, the long axis of the vertical adjustment waist hole 4d is parallel to the vertical direction. The stand column adjustment waist hole and the vertical adjustment waist hole 4d are fastened via a bolt, and the stand column fixing hole and the vertical fixing hole 4e are fastened via a bolt.

When it is necessary to adjust the angle of the main beam 1 in the height direction via the stand column top seat, loosen the bolt connecting the stand column adjustment waist hole and the vertical adjustment waist hole 4d, then adjust the main beam 1 in the height direction to a proper angle, and last tighten the bolts.

Of course, the long axis of the vertical adjustment waist hole 4d can also be perpendicular to the vertical direction, and the long axis of the stand column adjustment waist hole can be parallel to the vertical direction, which can also achieve the purpose of adjusting the angle of the main beam 1 in the height direction.

Figure 4:
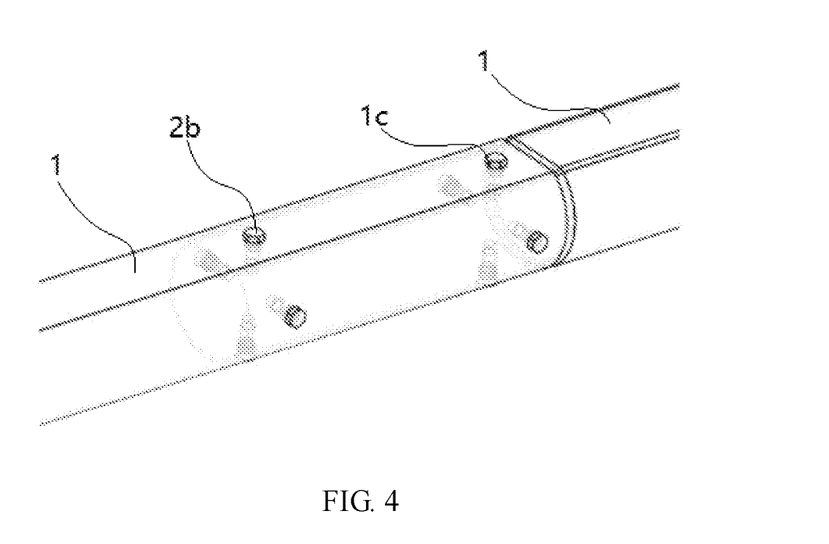
FIG. 4 is a view showing connection of adjacent main beams.
Figure 5:
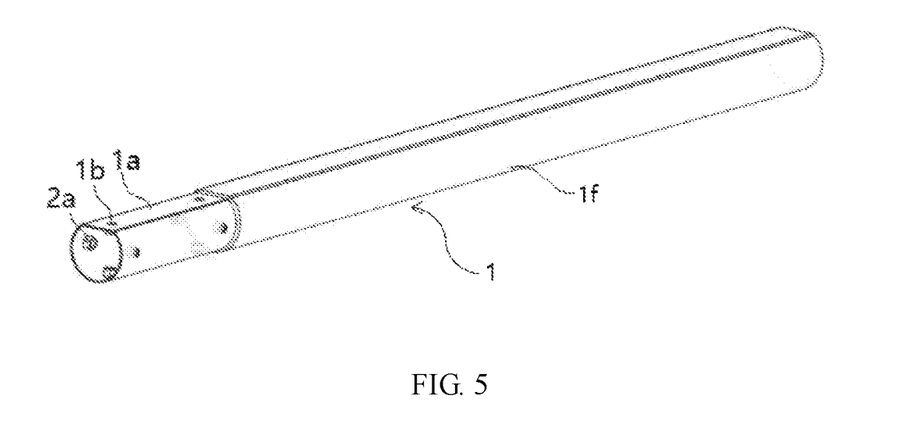
FIG. 5 is a perspective view of a shrinkable pipe section of a main beam.
Figure 6:
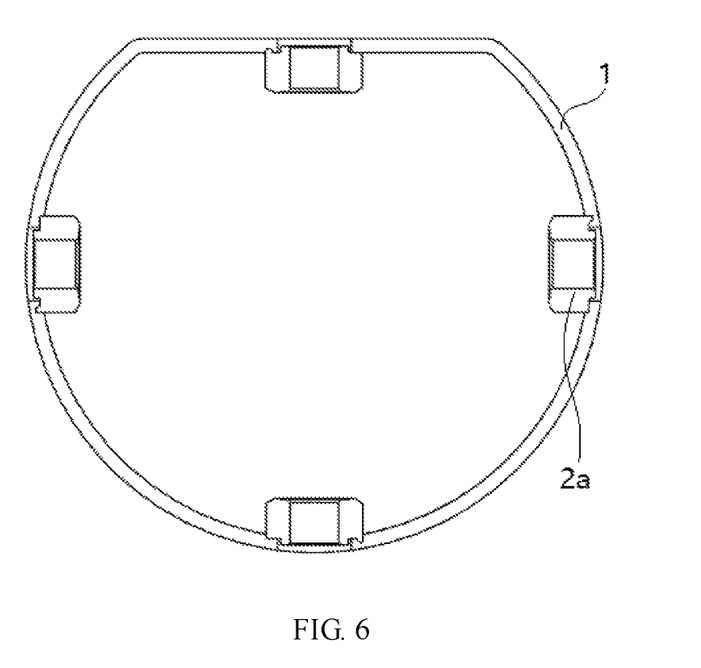
FIG. 6 is a structural view of a shrinkable pipe section of a first main beam.

As shown in FIGS. 4-6, a first end of the main beam 1 is a shrinkable pipe section 1a, the shrinkable pipe section 1a is formed by extruding the first end of the main beam 1 (the left end of the main beam 1 in FIG. 5). The shrinkable pipe section 1a is perforated with 8 first connecting holes 1b. The 8 first connecting holes 1b are divided into two groups, wherein 4 first connecting holes 1b in each group of the first connecting holes 1b are evenly circumferentially arranged on the shrinkable pipe section 1a. The two groups of the first connecting holes 1b are arranged along the axial direction of the main beam 1. As shown in FIG. 6, a locking nut 2a is welded to each first connecting hole 1b on the inner surface of the shrinkable pipe section 1a. As shown in FIG. 4, a second end of the main beam 1 (the right end of the main beam 1 in FIG. 5) is perforated with a second connecting hole 1c corresponding to the first connecting hole 1b of the shrinkable pipe section 1a, that is to say, the second end of the main beam 1 is perforated with 8 second connecting holes 1c. When adjacent main beams 1 are connected, the shrinkable pipe section 1a of the main beam 1 extends into the second end of the adjacent main beam 1, a locking bolt 2b sequentially passes through the second connecting hole 1c of the second end of the adjacent main beam 1 and the first connecting hole 1b of the shrinkable pipe section 1a of the main beam 1 and is fastened by screwing to a locking nut 2a at the first connecting hole 1b. That is to say, in the present example, 8 locking bolts 2b are needed to connect the adjacent main beams 1.

In other specific examples, the numbers of the first connecting hole 1b, the second connecting hole 1c, the locking nut 2a and the locking bolts 2b are not limited to the present example, but may be other numbers. The first connecting hole 1b may not be arranged on the shrinkable pipe section 1a, but may be arranged at any position of the shrinkable pipe section 1a, as long as the first connecting hole 1b and the second connecting hole 1c can be connected via the locking nut 2a and the locking bolt 2b, which is not limited herein.

Example 4

Figure 7:
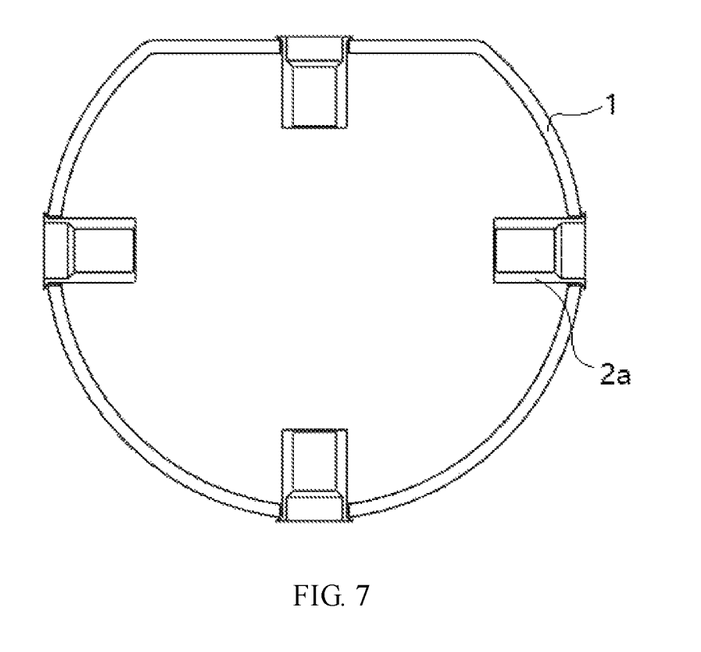
FIG. 7 is a structural view of a shrinkable pipe section of a second main beam.

As shown in FIG. 7, the structures of example 4 and example 3 are substantially the same. The difference between example 4 and example 3 is that the lock nut 2a of example 4 is riveted on the inner surface of the shrinkable pipe section 1a.

It should be noted that the above examples can be freely combined as required. The above are merely preferred embodiments of the present invention. It should be pointed out that for those of ordinary skill in the art, several improvements and modifications can be made without departing from the principle of the present invention, and these improvements and modifications should be regarded as the protection scope of the present invention.

What is claimed is:

1. A photovoltaic tracking bracket for use with a photovoltaic assembly, the photovoltaic tracking bracket comprising:
   a main beam comprising a flat plate;
   a stand column;
   a bearing seat comprising a bearing ring, a Z-shaped support plate and a bottom plate connected sequentially from top to bottom, the Z-shaped support plate having a Z-shaped cross section in a horizontal direction, the main beam being installed inside the bearing ring, the flat plate of the main beam configured to face the photovoltaic assembly, and the bottom plate being connected to the stand column; and
   a stand column top seat comprising a first connecting plate, wherein:
   both ends of the first connecting plate extend towards the stand column to form a second connecting plate, the second connecting plate is connected to the stand column, the first connecting plate is perforated with a first horizontal adjustment waist hole,
   the bottom plate is perforated with a second horizontal adjustment waist hole corresponding to the first horizontal adjustment waist hole,
   the first horizontal adjustment waist hole and the second horizontal adjustment waist hole are locked via a bolt, a long axis of the first horizontal adjustment waist hole and a long axis of the second horizontal adjustment waist hole are perpendicular to each other, and the long axis of the first horizontal adjustment waist hole is parallel or perpendicular to an extension direction of the main beam.

2. The photovoltaic tracking bracket according to claim 1, wherein two of the first horizontal adjustment waist holes are provided and symmetrical about a center of the first connecting plate, two of the second horizontal adjustment waist holes are provided and symmetrical about a center of the bottom plate.

3. The photovoltaic tracking bracket according to claim 1, wherein each of the second connecting plates is provided with a vertical adjustment waist hole and a vertical fixing hole, the stand column is provided with a stand column adjustment waist hole corresponding to the vertical adjustment waist hole, the stand column is provided with a stand column fixing hole corresponding to the vertical fixing hole, a long axis of the vertical adjustment waist hole and a long axis of the stand column adjustment waist hole are perpendicular to each other, the stand column adjustment waist hole and the vertical adjustment waist hole are fastened via a bolt, the stand column fixing hole and the vertical fixing hole are fastened via a bolt.

4. The photovoltaic tracking bracket according to claim 1, wherein:

a first end of the main beam is a shrinkable pipe section formed by extruding the first end of the main beam, an inner surface of the shrinkable pipe section is welded or riveted with a locking nut; and the shrinkable pipe section of the main beam extends into a second end of an adjacent main beam, a locking bolt sequentially passes through the second end of the adjacent main beam and the shrinkable pipe section of the main beam and is fastened by screwing to a corresponding locking nut.

5. The photovoltaic tracking bracket according to claim 4, wherein a plurality of locking nuts are provided and are evenly arranged on the inner surface of the shrinkable pipe section of the main beam, the locking nuts are the locking bolts are provided in one-to-one correspondence.

6. The photovoltaic tracking bracket according to claim 1, wherein, the main beam further comprises an elliptical curved plate, each of both ends of the flat plate being respectively fixedly connected to a corresponding end of the elliptical curved plate to form a ring shape, and a plane where the flat plate is located being perpendicular to a long axis of an ellipse where the elliptical curved plate is located.

7. The photovoltaic tracking bracket according to claim 6, wherein, a transition section is provided between the flat plate and the elliptical curved plate, and an outer surface of the transition section is smooth.

8. The photovoltaic tracking bracket according to claim 7, wherein, a reflective layer is provided on an outer surface of the flat plate and the transition section.

9. A method of using a photovoltaic tracking bracket with a photovoltaic assembly, comprising providing the photovoltaic tracking bracket as defined in claim 1, wherein the photovoltaic tracking bracket is installed with a double-sided photovoltaic assembly.

* * * * *